US012750590B2

(12) United States Patent
Koguchi et al.

(10) Patent No.: US 12,750,590 B2
(45) Date of Patent: Sep. 29, 2026

(54) IMAGING DEVICE, IMAGING METHOD, AND IMAGING PROGRAM

(71) Applicant: FUJIFILM Corporation, Tokyo (JP)

(72) Inventors: Takehiro Koguchi, Saitama (JP); Taro Saito, Saitama (JP); Yukinori Nishiyama, Saitama (JP); Tomoharu Shimada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 120 days.

(21) Appl. No.: 18/974,680

(22) Filed: Dec. 9, 2024

(65) Prior Publication Data

US 2025/0106524 A1 Mar. 27, 2025

Related U.S. Application Data

(63) Continuation of application No. 18/472,198, filed on Sep. 21, 2023, now Pat. No. 12,225,298, which is a (Continued)

(30) Foreign Application Priority Data

Mar. 25, 2020 (JP) ................................ 2020-053920

(51) Int. Cl.

*H04N 23/72* (2023.01)
*G03B 7/093* (2021.01)

(Continued)

(52) U.S. Cl.

CPC ............. *H04N 23/72* (2023.01); *G03B 7/093* (2013.01); *G06T 7/20* (2013.01); *H04N 5/2222* (2013.01);

(Continued)

(58) Field of Classification Search

CPC ...... H04N 23/72; H04N 5/2222; H04N 23/75; H04N 23/55; H04N 23/69; H04N 23/73;

(Continued)

(56) References Cited

U.S. PATENT DOCUMENTS

| | | | | |
|---|---|---|---|---|
| 8,884,167 | B2 | 11/2014 | Miyasaka et al. | |
| 2010/0157136 | A1 * | 6/2010 | Li | H04N 23/73 348/349 |

(Continued)

FOREIGN PATENT DOCUMENTS

| | | |
|---|---|---|
| JP | 2003161982 | 6/2003 |
| JP | 2006005853 | 1/2006 |

(Continued)

OTHER PUBLICATIONS

"Notice of Reasons for Refusal of Japan Counterpart Application", issued on Dec. 2, 2024, with English translation thereof, pp. 1-10.

(Continued)

*Primary Examiner* — Lin Ye
*Assistant Examiner* — Tuan H Le
(74) *Attorney, Agent, or Firm* — JCIPRNET

(57) ABSTRACT

Provided are an imaging device, an imaging method, and an imaging program capable of easily acquiring a slow moving image with good image quality. In one aspect of the present invention, an imaging device includes an optical system, an imaging element, and a processor, and the processor performs detection processing of detecting a movement of a subject based on an image signal output from the imaging element, frame rate control of increasing a frame rate of a moving image output from the imaging element based on the detected movement, exposure control processing of maintaining a rate of an exposure time per frame of the moving image constant according to the increase in the frame rate, and dimming control processing of changing a degree of (Continued)

dimming of the optical system according to the exposure control processing.

13 Claims, 14 Drawing Sheets

Related U.S. Application Data continuation of application No. 17/899,621, filed on Aug. 31, 2022, now Pat. No. 11,805,320, which is a continuation of application No. PCT/JP2021/011307, filed on Mar. 19, 2021.

(51) Int. Cl.
*G06T 7/20* (2017.01)
*H04N 5/222* (2006.01)
*H04N 23/75* (2023.01)

(52) U.S. Cl.
CPC ... *H04N 23/75* (2023.01); *G06T 2207/10016* (2013.01); *G06T 2207/10144* (2013.01); *G06T 2207/10152* (2013.01)

(58) Field of Classification Search
CPC ...... H04N 23/951; H04N 23/60; G03B 7/093; G06T 7/20; G06T 2207/10016; G06T 2207/10144; G06T 2207/10152; G06T 7/254
See application file for complete search history.

(56) References Cited

U.S. PATENT DOCUMENTS

| | | | | |
|---|---|---|---|---|
| 2012/0162462 | A1* | 6/2012 | Takeuchi | H04N 23/673<br>348/222.1 |
| 2012/0212663 | A1* | 8/2012 | Takita | H04N 23/75<br>348/E5.04 |
| 2015/0195473 | A1* | 7/2015 | Inoue | G02B 7/38<br>348/294 |
| 2015/0281547 | A1* | 10/2015 | Terasawa | H04N 23/745<br>348/226.1 |
| 2017/0078543 | A1* | 3/2017 | Lee | H04M 1/0264 |
| 2017/0104909 | A1* | 4/2017 | Nakajima | H04N 23/75 |
| 2022/0224832 | A1* | 7/2022 | Duran | H04N 23/61 |

FOREIGN PATENT DOCUMENTS

| | | |
|---|---|---|
| JP | 2006148273 | 6/2006 |
| JP | 2012151190 | 8/2012 |
| JP | 2012151901 | 8/2012 |
| JP | 2015139025 | 7/2015 |

OTHER PUBLICATIONS

"Office Action of Japan Counterpart Application", issued on Apr. 21, 2025, with English translation thereof, pp. 1-10.
"Decision of Refusal of Japan Counterpart Application", issued on Aug. 6, 2025, with English translation thereof, p. 1-p. 6.

* cited by examiner

IMAGING DEVICE, IMAGING METHOD, AND IMAGING PROGRAM

CROSS-REFERENCE TO RELATED APPLICATIONS

The present application is a continuation application of and claims the priority benefit of U.S. patent application Ser. No. 18/472,198, filed on Sep. 21, 2023, now allowed. The U.S. patent application Ser. No. 18/472,198 is a continuation application of and claims the priority benefit of U.S. patent application Ser. No. 17/899,621, filed on Aug. 31, 2022, now patented with U.S. Pat. No. 11,805,320 B2, which is a continuation of PCT International Application No. PCT/JP2021/011307 filed on Mar. 19, 2021 claiming priority under 35 U.S.C § 119(a) to Japanese Patent Application No. 2020-053920 filed on Mar. 25, 2020. Each of the above applications is hereby expressly incorporated by reference, in its entirety, into the present application.

BACKGROUND OF THE INVENTION

1. Field of the Invention

The present invention relates to an imaging device that captures a moving image, an imaging method, and an imaging program.

2. Description of the Related Art

Regarding a technique for capturing a moving image, for example, an imaging device that controls a transmittance of a filter according to a change in a frame rate of imaging is described in WO2015/151813A.

SUMMARY OF THE INVENTION

One embodiment according to the technique of the present disclosure provides an imaging device, an imaging method, and an imaging program capable of easily acquiring a slow moving image with good image quality for a moving subject.

An imaging device according to a first aspect of the present invention comprises an optical system, an imaging element, a sensor, and a processor. The sensor is configured to detect a physical movement of the imaging device. The processor is configured to perform detection processing of detecting a movement of a subject based on the detected physical movement of the imaging device, frame rate control of increasing a frame rate of a moving image output from the imaging element based on the detected movement of the subject, exposure control processing of maintaining a rate of an exposure time per frame of the moving image constant according to the increase in the frame rate, and dimming control processing of changing a degree of dimming of the optical system according to the exposure control processing.

In the first aspect of the present invention, the processor is further configured to calculate a first timing for starting to change the frame rate and the exposure time and a second timing for setting the frame rate and the exposure time as target values based on the detected movement of the subject, increase the frame rate from the first timing to the second timing, and shorten the exposure time from the first timing to the second timing.

In the imaging device according to a second aspect in the first aspect, the processor calculates a timing at which a distance between a plurality of subjects is equal to or less than a threshold value as the second timing based on the detected movement of the subject in the frame rate control.

In the imaging device according to a third aspect in the second aspect, the processor sets a rate of change in the frame rate and the exposure time according to a relative speed between the plurality of subjects.

In the imaging device according to a fourth aspect in any one of the first to third aspects, the processor sets the target values for the frame rate and the exposure time.

In the imaging device according to a fifth aspect in any one of the first to fifth aspects, the processor returns values of the frame rate, the exposure time, and the degree of dimming to values set before starting the frame rate control, the exposure control processing, and the dimming control processing after the second timing has elapsed.

In the imaging device according to a sixth aspect in any one of the first to fifth aspects, the processor captures a first moving image, which is a moving image of the increased frame rate after the first timing, by setting a bit rate higher as the frame rate is higher.

In the imaging device according to an seventh aspect in the sixth aspect, the processor sets an exposure time per frame to half or more of a frame interval for the first moving image.

In the imaging device according to a eighth aspect in the sixth or seventh aspect, the processor displays the first moving image on a display device at the same initial frame rate as before starting the frame rate control.

In the imaging device according to a ninth aspect in the eighth aspect, the processor thins out a frame of the first moving image to generate a second moving image having the initial frame rate and displays the first moving image and the second moving image on the display device at the initial frame rate.

In the imaging device according to an tenth aspect in any one of the first to ninth aspects, the processor outputs information prompting a user to set at least one of a frame rate, an exposure time, a degree of dimming of a dimming element, a stop, a sensitivity, or a bit rate.

In the imaging device according to a eleventh aspect in any one of the first to tenth aspects, the optical system has a stop mechanism in which a degree of stop is variable. The processor changes the degree of stop of the stop mechanism to a release side in accordance with shortening of the exposure time.

An imaging method according to a twelfth aspect of the present invention is an imaging method by an imaging device including an optical system, an imaging element, a sensor, and a processor. The method comprises a detection step of detecting a physical movement of the imaging device by the sensor, a detection step of detecting a movement of a subject based on the detected physical movement of the imaging device by the processor, a frame rate control step of continuously increasing a frame rate of a moving image output from the imaging element based on the detected movement of the subject by the processor, an exposure control step of maintaining a rate of an exposure time per frame of the moving image constant according to the increase in the frame rate by the processor, and a dimming control step of changing a degree of dimming of the optical system according to the control of the exposure time by the processor. In the twelfth aspect, a first timing for starting to change the frame rate and the exposure time, and a second timing for setting the frame rate and the exposure time as target values, are calculated based on the detected movement of the subject. The frame rate is increased from the first timing to the second timing. In addition, the exposure time is shortened from the first timing to the second timing. The imaging method according to the twelfth aspect may further include the same configurations as those of the second to eleventh aspects.

An non-transitory, computer-readable tangible recording medium according to a thirteenth aspect of the present invention. The non-transistor computer-readable tangible recording medium records thereon, a program for causing, when read by a computer, the computer to perform the imaging method according to the twelfth aspect.

BRIEF DESCRIPTION OF THE DRAWINGS

FIGS. 6A to 6C are graphs showing a state of controlling a frame rate and the like.

FIGS. 8A to 8C are other graphs showing a state of controlling the frame rate and the like.

DESCRIPTION OF THE PREFERRED EMBODIMENTS

One embodiment of an imaging device, an imaging method, and an imaging program according to the present invention is as follows. In the description, accompanying drawings will be referred to as necessary.

First Embodiment

<Overall Configuration of Imaging Device>

Figure 1:
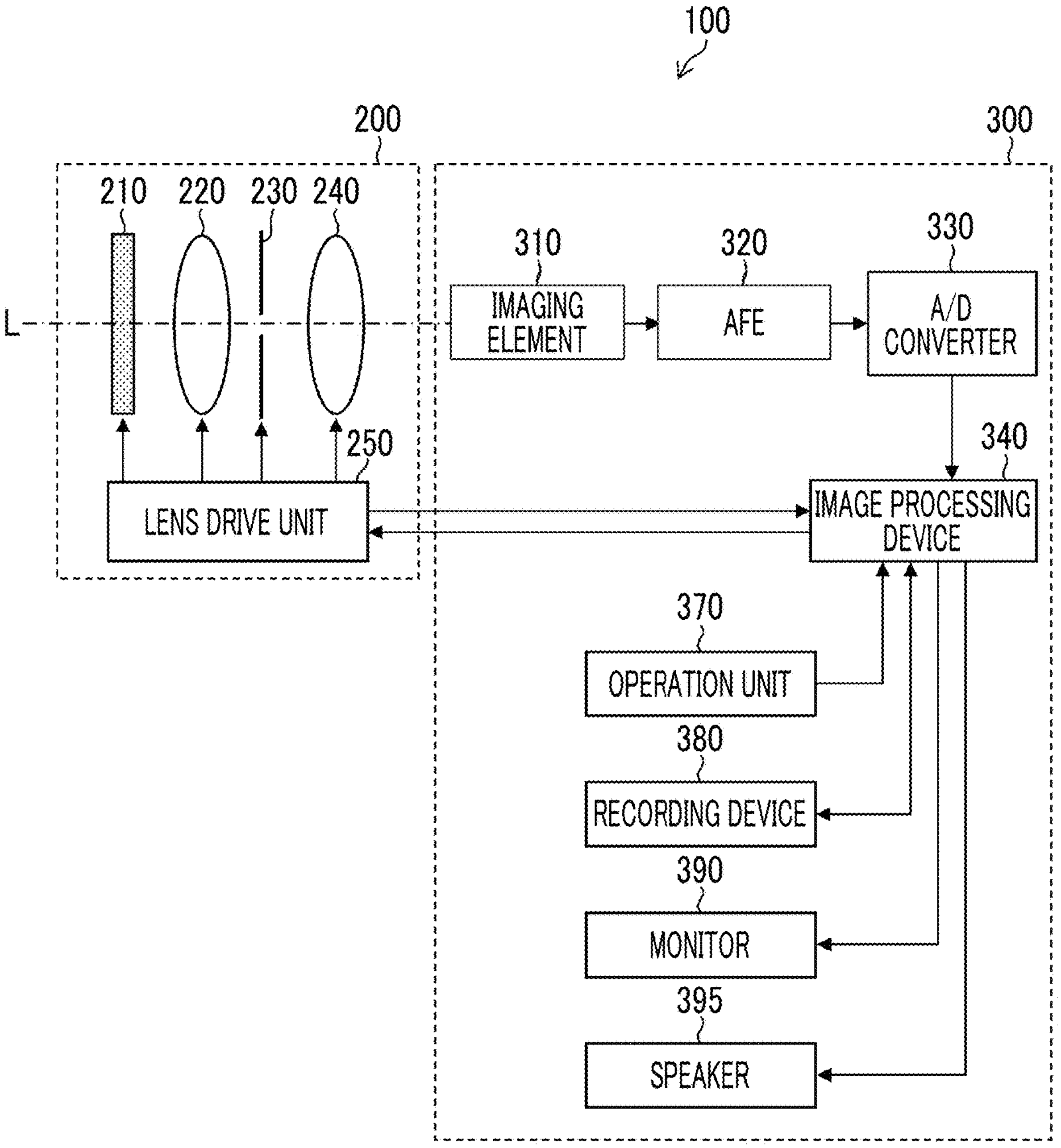
FIG. 1 is a diagram showing a schematic configuration of an imaging device according to a first embodiment.

FIG. 1 is a diagram showing a schematic configuration of a camera 100 (imaging device and optical system) according to a first embodiment. The camera 100 is configured of an interchangeable lens 200 (optical system) and an imaging device body 300 (imaging device body) and forms a subject image (optical image) on an imaging element 310 with an imaging lens including a zoom lens 220 and a focus lens 240 described below. The interchangeable lens 200 and the imaging device body 300 can be attached and detached through a mount (not shown). Although the case where the camera 100 comprises the interchangeable lens 200 is described in the first embodiment, a lens device (optical system) may be fixed to a camera body in the present invention.

<Configuration of Interchangeable Lens>

The interchangeable lens 200 comprises a dimming element 210, a zoom lens 220, a stop 230, a focus lens 240, and a lens drive unit 250. The lens drive unit 250 drives the zoom lens 220 and the focus lens 240 forward and backward in response to a command from an image processing device 340 (lens drive control unit 360 in FIG. 2: processor) to perform zoom (optical zoom) adjustment and focus adjustment. The zoom adjustment and the focus adjustment may be performed in response to a zoom operation and a focus operation (moving rotationally with a zoom ring and a focus ring (not shown) or the like) performed by a user, in addition to the command from the image processing device 340. Further, the lens drive unit 250 changes a degree of dimming of the dimming element 210 (dimming element, dimming filter, and optical system) in response to the command from the image processing device 340 (lens drive control unit 360). Furthermore, the lens drive unit 250 controls the stop 230 (stop mechanism) in response to the command from the image processing device 340 to adjust exposure. On the other hand, information such as positions of the zoom lens 220 and the focus lens 240 and an opening degree of the stop 230 is input to the image processing device 340. The interchangeable lens 200 has an optical axis L.

<Configuration of Dimming Element and Stop>

The dimming element 210 is configured of, for example, a variable neutral density (ND) filter and can change the degree of dimming. The degree of dimming can be changed, for example, by stacking and relatively rotating a plurality of ND filters having different degrees of dimming in a rotation direction. Alternatively, a dimming element may be configured by using an electrochromic element, and a voltage applied to the element may be changed to change the degree of dimming. Further, the dimming element may be configured by using a liquid crystal display element, and a liquid crystal transmittance may be changed to change the degree of dimming. The stop 230 (stop mechanism) is configured of a vane-shaped member or a plate-shaped member that is movable and/or rotatable and can change a degree of stop. A stop having a variable stop may be configured by using a liquid crystal display element. Although FIG. 1 describes an aspect in which the dimming element 210 and the stop 230 are provided in the interchangeable lens 200, the dimming element and/or the stop may be provided on the imaging device body 300 side.

<Configuration of Imaging Device Body>

The imaging device body 300 comprises the imaging element 310 (imaging element), an analog front end (AFE) 320, an analog to digital (A/D) converter 330, and the image processing device 340 (processor, condition setting unit, detection processing unit, frame rate control unit, exposure control processing unit, imaging unit, dimming control processing unit, stop control unit, display control unit, information output unit, and lens drive control unit). Further, the imaging device body 300 comprises an operation unit 370, a recording device 380 (recording device), a monitor 390 (display device), and a speaker 395. The imaging device body 300 may have a shutter (not shown) for blocking light transmitted through the imaging element 310. The shutter may be a mechanical shutter or an electronic shutter. In a case of the electronic shutter, the image processing device 340 controls a charge accumulation period of the imaging element 310, and thus an exposure time (shutter speed) can be adjusted.

The imaging element 310 comprises a light receiving surface in which a large number of light receiving elements are arranged in a matrix. Then, subject light transmitted through the dimming element 210 (dimming element, dimming filter, and optical system), the zoom lens 220 (optical system), the stop 230 (stop mechanism and optical system), and the focus lens 240 (optical system) is formed on the light receiving surface of the image element 310 and is converted into an electric signal by each light receiving element. A color filter of R (red), G (green), or B (blue) is provided on the light receiving surface of the imaging element 310, and a color image of a subject can be acquired based on a signal of each color. Various photoelectric conversion elements such as complementary metal-oxide semiconductor (CMOS) and charge-coupled device (CCD) can be used as the imaging element 310. The AFE 320 performs noise removal, amplification, and the like of an analog image signal output from the imaging element 310, and the A/D converter 330 converts the captured analog image signal into a digital image signal with a gradation width.

In a case where the imaging element 310 is the CMOS, the AFE 320 and the A/D converter 330 are often included in the imaging element 310. As an example of using the CMOS, the A/D converter 330 built in the imaging element 310 converts the analog image signal output from the imaging element 310 into the digital image signal. Thereafter, a digital processing unit (not shown) built in the imaging element 310 performs digital sampling two correlation pile, digital gain processing, correction processing, and the like to convert the analog image signal into the digital image signal.

<Configuration of Image Processing Device>

Figure 2:
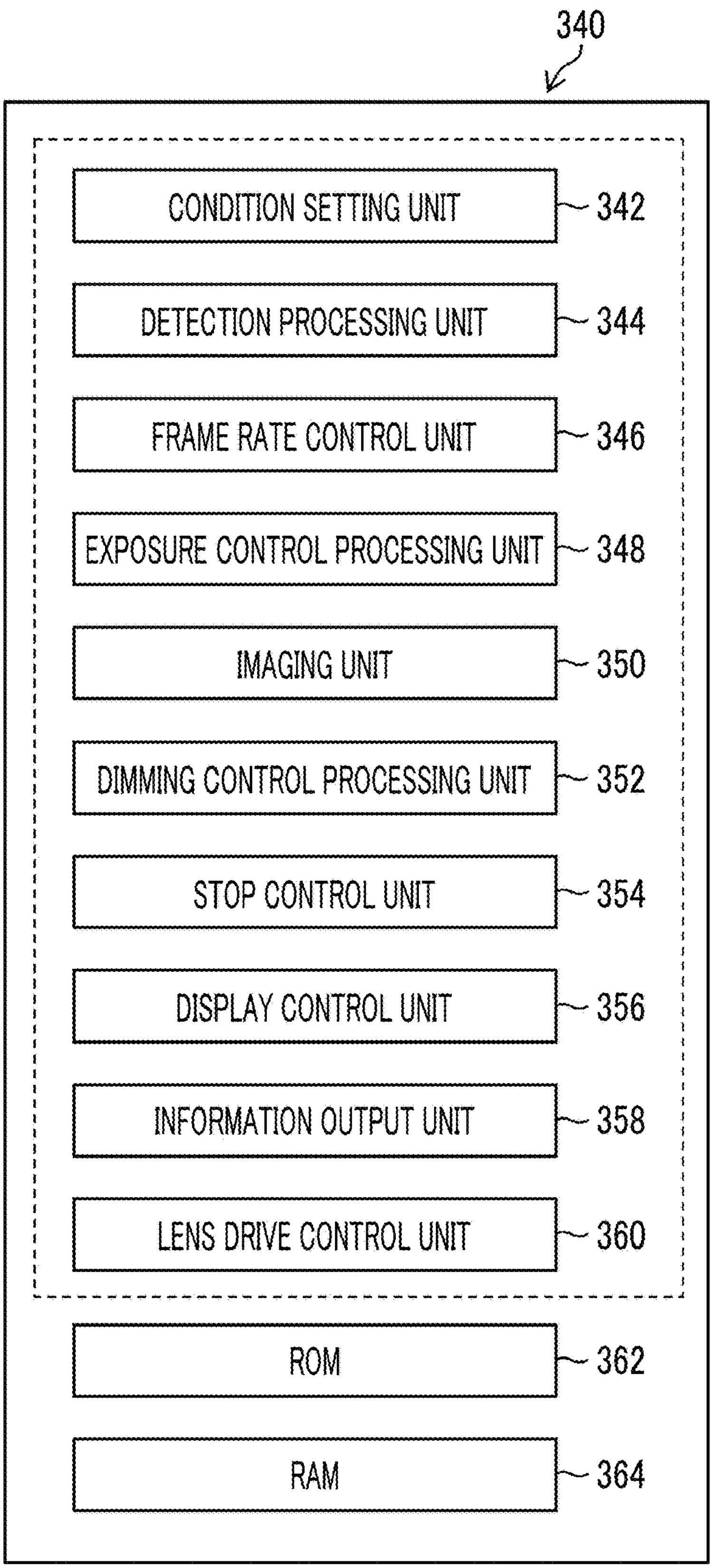
FIG. 2 is a diagram showing a functional configuration of an image processing device.

FIG. 2 is a diagram showing a functional configuration of the image processing device 340 (processor). The image processing device 340 comprises a condition setting unit 342, a detection processing unit 344, a frame rate control unit 346, an exposure control processing unit 348, an imaging unit 350, a dimming control processing unit 352, a stop control unit 354, a display control unit 356, an information output unit 358, and the lens drive control unit 360. The image processing device 340 performs processing such as moving image capturing (imaging) and generation and still image capturing (imaging) and generation based on the digital image signal input from the A/D converter 330. The processing by the image processing device 340 will be described below in detail.

Functions of the image processing device 340 can be realized by using various processors. The various processors include, for example, a central processing unit (CPU), which is a general-purpose processor that executes software (program) to realize various functions. Further, the various processors described above include a graphics processing unit (GPU), which is a processor specialized in image processing. Further, the various processors described above include a programmable logic device (PLD), which is a processor whose circuit configuration can be changed after manufacturing such as a field programmable gate array (FPGA). Furthermore, the various processors described above include a dedicated electric circuit, which is a processor having a circuit configuration specially designed for executing specific processing such as an application specific integrated circuit (ASIC).

Each function of the image processing device 340 may be realized by one processor or may be realized by a plurality of processors. Further, one processor may support a plurality of functions. Furthermore, each function of the image processing device 340 may be realized by a circuit, or a part of each function may be realized by a circuit and the rest may be realized by a processor.

In a case where the above processor or circuitry executes the software (program), a processor (computer) readable code of the executed software is stored in a non-transitory recording medium such as a read only memory (ROM). The processor then refers to the software. The software stored in the non-transitory recording medium includes an imaging program (program for operating imaging device) for executing an imaging method according to the present invention. The code may be recorded in various magneto-optical storages and a non-transitory recording medium such as a semiconductor memory, instead of the ROM. In a case where the processing is performed by using the software, for example, a random access memory (RAM) may be used as a temporary storage area, and for example, data stored in an electronically erasable and programmable read only memory (EEPROM) (not shown) may also be referred to.

The image processing device 340 comprises a ROM 362 (non-transitory recording medium, memory) in addition to the above-mentioned parts. The ROM 362 records a computer (for example, various processors constituting image processing device 340) readable code of a program (including program for executing imaging method according to the present invention) necessary for capturing, recording, displaying, and the like of the image. Further, the image processing device 340 comprises a temporary storage area and a RAM 364 (memory) as a work area.

<Operation Unit>

The operation unit 370 has a release button, a button for operation (for example, a cross button, a Quick button, an OK button, or the like), a dial, a switch, and the like, which are not shown, and the user can perform various operations such as an imaging mode setting, an imaging condition setting, a moving image capturing instruction, and a still image capturing instruction. Further, the image processing device 340 can receive these user instructions. The monitor 390 (display device) may be configured of a touch panel type device and used as an operation unit.

<Recording Device>

The recording device 380 (recording device) is configured of various magneto-optical recording media, a non-transitory recording medium such as a semiconductor memory, and a control circuit thereof and stores moving images (first moving image, second moving image, normal moving image, and the like), still images, and the like. As a recording medium, a type capable of being attached to and detached from the imaging device body 300 can be used. The captured images (moving image and still image) may be transmitted to and stored in an external (other than recording device 380) recording medium or recording device by, for example, wired and/or wireless communication.

<Monitor and Speaker>

The monitor 390 (display device) is configured of, for example, a touch panel type liquid crystal display panel and can display the moving images (normal moving image and slow moving image), the still image, a message to the user (for example, information prompting user to set at least one of frame rate, exposure time, dimming degree of dimming element, stop, sensitivity, or bit rate), and the like. The monitor 390 can be disposed on a back surface side, a top surface side, or the like of the imaging device body 300. This message may be output by voice from the speaker 395. The camera 100 may be provided with an optical and/or electronic viewfinder.

<Problem in Slow Imaging and Method of Present Invention>

In general, an exposure time of half or more of the frame rate is considered to be appropriate as the exposure time of the moving image (example: exposure time of 1/120 sec or more for a 60 frame per second (fps). In a case where the exposure time thereof is shorter than the exposure time of half or more of the frame rate, a phenomenon in which a movement of the subject becomes jerky and intermittent (so-called "sense of ruffling") occurs, which is said to be unsuitable for the moving image. In order to extend the exposure time while maintaining appropriate exposure, the sensitivity may be reduced or the stop may be narrowed down. However, there is a limit on the reduction of the sensitivity, and the moving image may be different from the imaging person's intention due to a change in a depth of field in a case where the stop is narrowed down. For this reason, an expensive imaging device such as a device for movie imaging is equipped with a function capable of reducing an amount of light with a built-in ND filter or the like to extend the exposure time while maintaining the sensitivity and stop conditions constant.

In addition, there is a known function called "slow imaging" in which the imaging is performed at a frame rate (high frame rate) higher than a normal frame rate at the time of imaging and reproduction is performed at the normal frame rate at the time of reproduction (example: imaging at 240 fps and reproduction at 60 fps make 4 times slow). Hereinafter, the moving image captured by this function is referred to as "slow moving image".

Since the frame rate is high in the slow imaging, the imaging needs to be performed with a high-speed shutter (short exposure time) according to the general imaging method described above (exposure time of 1/480 sec or more at 240 fps). In a case where a state where the imaging is performed with the appropriate exposure at the normal frame rate is switched to the slow imaging such that the sense of ruffling does not occur, the exposure time needs to be significantly changed in accordance with the switching to the high frame rate. However, since the dimming degree of the ND filter cannot be changed in an instant (short time), the sensitivity that can be changed in an instant (short time) is switched. However, with the switching of the sensitivity, "sense of granularity" (presence or absence, degree, pattern, and the like of granular noise in image) may change. In the imaging in sports and the like, the switching of the sensitivity is used with the knowledge that the sense of granularity may change since retaking is not possible. However, the change in the sense of granularity is more problematic in movie imaging and the like in which retaking is possible. Thus, in general, the amount of light is adjusted with the ND filter to make the sensitivity uniform, and a normal frame rate portion and a high frame rate portion are separately imaged.

However, such multiple times of imaging take time and effort and cannot be employed in a case where the subject is moving, such as in sports. As described above, a slow moving image with good image quality for a moving subject cannot be easily acquired in the related art.

Thus, as an effective function in a case where the normal frame rate is switched to the slow imaging, the inventors of the present application propose a method in which the switching to the slow imaging proceeds gradually (moving image is captured while increasing frame rate, and captured moving image is displayed at constant rate). Specifically, as described in detail below, the frame rate of the moving image is gradually (continuously or stepwise, the same applies hereinafter) increased based on the movement of the subject, and the exposure time is shortened according to the change in the frame rate. In this case, the dimming degree of the dimming element (density of ND filter) is gradually changed in order to maintain the appropriate exposure in accordance with the change in the exposure time due to the frame rate change. Accordingly, it is possible to perform the switching to the slow imaging such that the effect is maximized at a most effective timing (for example, timing of event occurrence) according to the movement of the subject and thus easily acquire the slow moving image with good image quality for the moving subject.

<Processing of Imaging Method>

Figure 3:
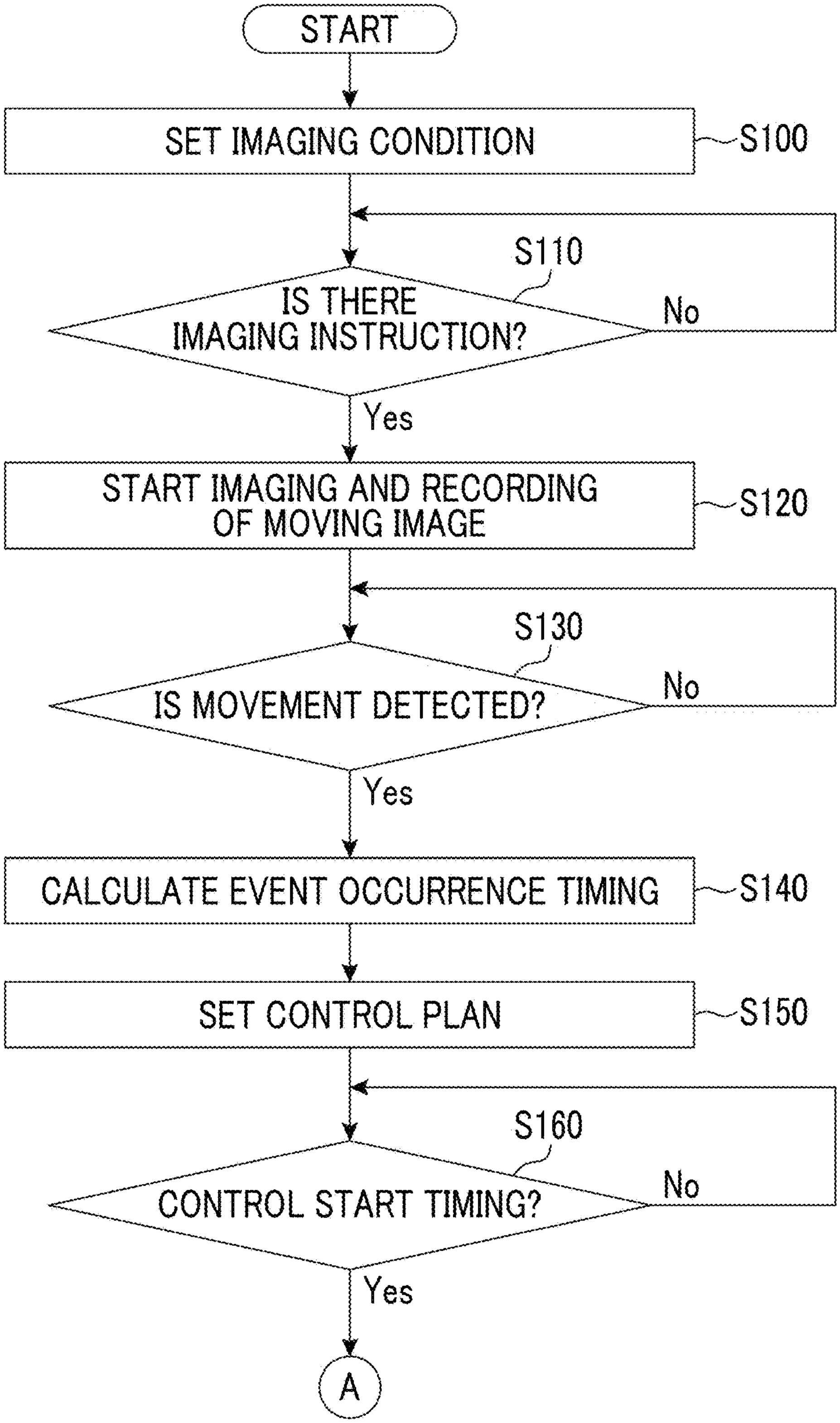
FIG. 3 is a flowchart showing processing of an imaging method according to the first embodiment.
Figure 4:
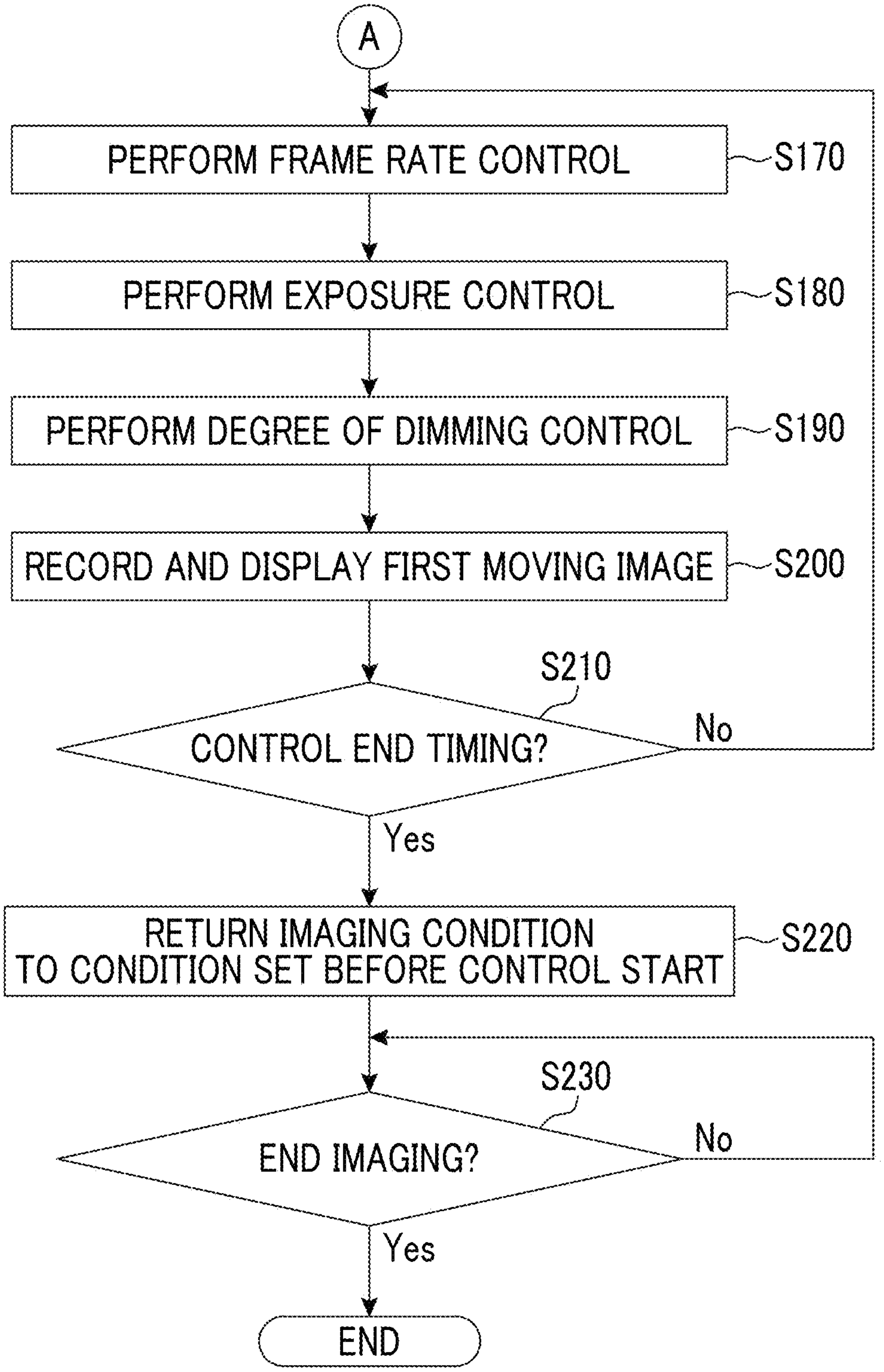
FIG. 4 is a flowchart (continuation of FIG. 3) showing the processing of the imaging method according to the first embodiment.

FIGS. 3 and 4 are flowcharts showing processing of the imaging method according to the first embodiment.

<Setting of Imaging Condition>

The condition setting unit 342 (processor) sets an imaging condition for the moving image (step S100: setting processing, setting step). Examples of the imaging condition set in step S100 include the frame rate of the moving image, an exposure time per frame, the stop, initial values and/or target values of the degree of dimming and the like, the frame rate, the exposure time, and a time to reach the target value from the start of changing the degree of dimming (first period). The condition setting unit 342 may set the imaging condition in response to the user's operation via the operation unit 370 or the monitor 390 or may set a predetermined imaging condition.

<Imaging of Normal Moving Image>

In a case where there is an imaging instruction (YES in step S110), the imaging unit 350 (processor) starts imaging and recording the moving image (normal moving image) (step S120). At this point, the frame rate and exposure time remain at their initial values.

<Calculation of Event Occurrence Timing Based on Movement>

The detection processing unit 344 (processor) detects the movement of the subject based on, for example, a difference (movement vector) between frames (step S130: detection processing, detection step). In a case where the movement is detected (YES in step S130), the detection processing unit 344 calculates a timing of event occurrence based on the movement.

Figure 5A:
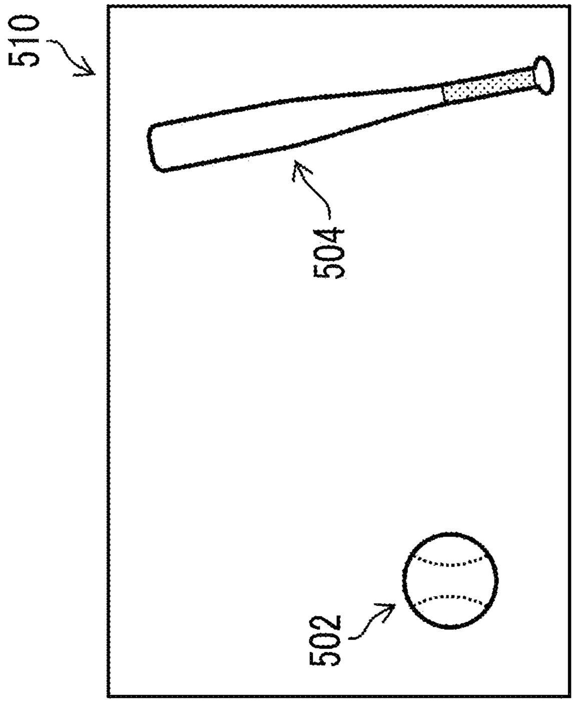
FIGS. 5A and 5B are diagrams showing a state of calculating an event timing based on a movement of a subject.
Figure 5B:
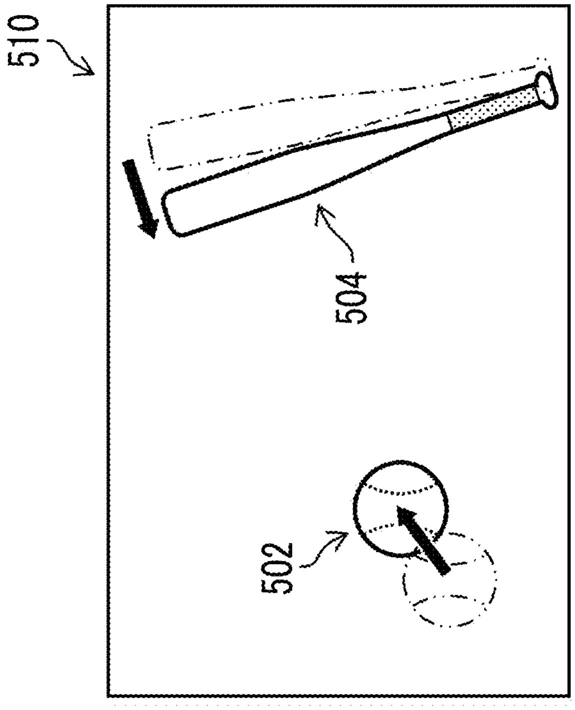

FIGS. 5A and 5B are diagrams showing a state of calculating the event timing based on the movement of the subject. FIG. 5A shows a state in which a ball 502 and a bat 504 are shown in a field of view 500 of the camera 100, and FIG. 5B shows a state in which the ball 502 and the bat 504 are moving. The term "event" may be, for example, a state in which a plurality of subjects collide or overlap each other as viewed from the camera 100, or a distance between the subjects is equal to or less than a threshold value (predetermined value or less). In the case of FIGS. 5A and 5B, the detection processing unit 344 calculates the event timing with the collision between the ball 502 and the bat 504 as the "event". Since a batter may miss the ball (the ball 502 and the bat 504 do not collide), the event timing may be calculated with a case where the distance is equal to or less a threshold value, which is larger than zero, as the "event" in addition to the case where the distance is zero (collision).

<Setting of Control Plan>

The image processing device 340 (frame rate control unit 346 and exposure control processing unit 348; processor) sets a control plan for the frame rate and the exposure based on the event occurrence timing calculated from the movement of the subject (step S150: frame rate control, exposure control processing, frame control step, and exposure control step). Specifically, the frame rate control unit 346 and the exposure control processing unit 348 set the control plan including a first timing for starting to change the frame rate and the exposure time and a second timing for setting the frame rate and the exposure time to the target values (step S150: control plan setting, control plan setting step). For example, in the case of FIGS. 5A and 5B, the frame rate control unit 346 can calculate a moment at which the ball 502 and the bat 504 collide (event occurrence timing) as the second timing and a timing preceding for the first period from the second timing as the first timing. For example, the frame rate control unit 346 and the exposure control processing unit 348 can set the control plan such as "since the event is predicted to occur after three seconds (second timing), start controlling the frame rate and the exposure time after one second (first timing) preceding for two seconds (first period) from the second timing and set the frame rate and the exposure time to the target values after three seconds (second timing)". In a case where multiple times of event occurrence are predicted, any event may be set as the second timing.

The frame rate control unit 346 may calculate a timing at which a set time has elapsed from the moment at which the ball 502 and the bat 504 collide (event occurrence) as the second timing. The frame rate control unit 346 may receive a value of the "first period" designated (in step S100) by the user in a case where the first timing is calculated or may use a predetermined value.

<Control of Frame Rate and Exposure Time>

Figure 6A:
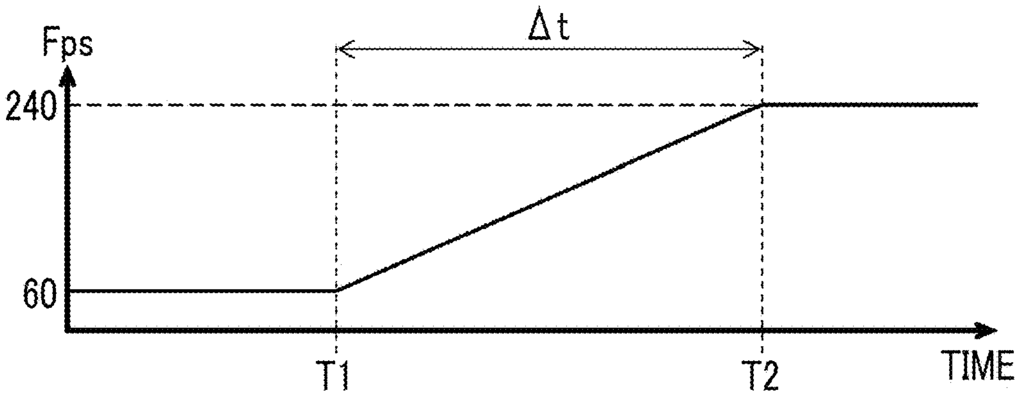
Figure 6B:
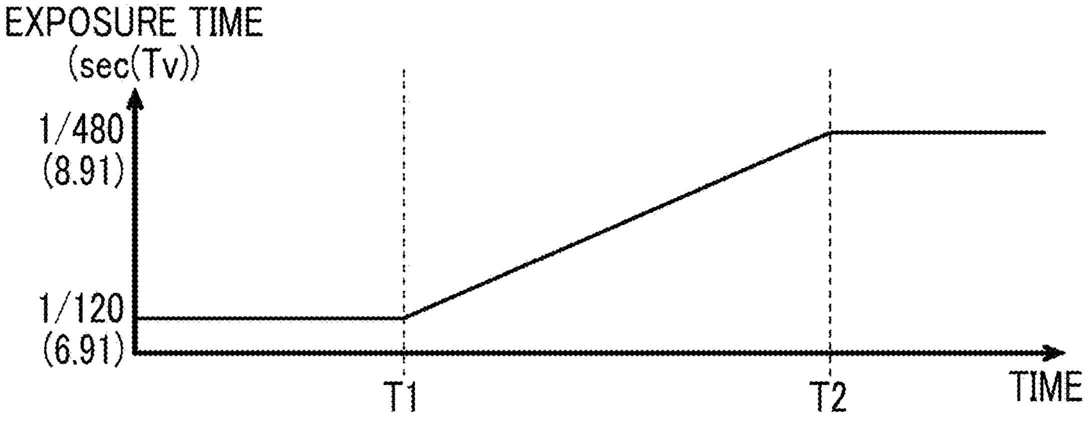
Figure 6C:
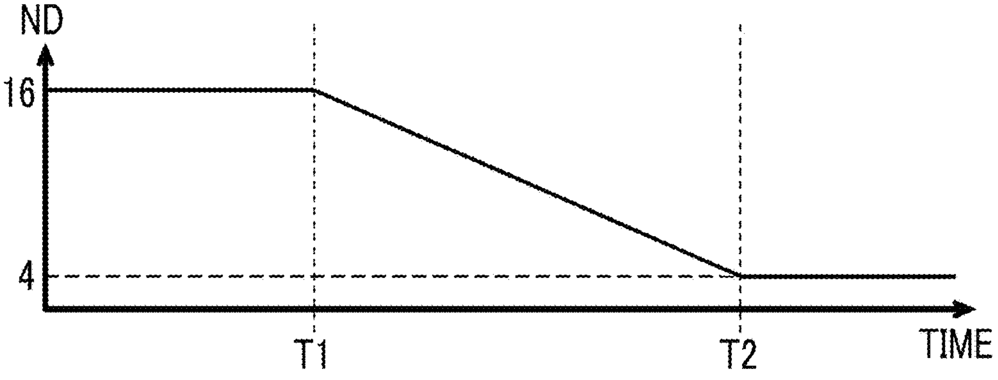

The image processing device 340 (processor) starts controlling the frame rate and the exposure time at the first timing (YES in step S160). FIGS. 6A to 6C are graphs showing a state of controlling the frame rate and the like. FIG. 6A shows the state of controlling the frame rate, and FIG. 6B shows the state of controlling the exposure time.

The frame rate control unit 346 (processor) continuously increases the frame rate of the moving image output from the imaging element 310 from a time point T1 (first timing) to a time point T2 (second timing) (step S170: frame rate control, frame rate control step). In the example shown in FIG. 6A, the frame rate control unit 346 (processor) changes the frame rate of the moving image from 60 frame per second (fps; initial frame rate) to 240 fps (target value). Note that Δt (=T2−T1) corresponds to "first period".

The exposure control processing unit 348 (processor) continuously shortens the exposure time per frame of the moving image from the time point T1 (first timing) to the time point T2 (second timing) according to the increase in the frame rate (step S180: exposure control processing, exposure control step). At the time point T1, the exposure time is 1/120 sec (initial exposure time, Tv value (time value) is 6.91). At the time point T2, the exposure time is 1/480 sec (target value, Tv value is 8.91). The exposure control processing unit 348 (processor) preferably sets the exposure time per frame to half or more of a frame interval. With such a setting, it is possible to suppress or reduce the phenomenon (so-called "sense of ruffling") in which the movement of the subject becomes jerky and intermittent in the captured moving image. In the examples shown in FIGS. 6A to 6C, the exposure time is half of the frame interval, and a rate (proportion) between the frame interval and the exposure time per frame is maintained constant.

<Control of Dimming Degree>

With the control of the frame rate and the exposure time described above, a moving image (first moving image, slow moving image) that gradually slows down during reproduction can be obtained. However, in a case where only the exposure time is changed in accordance with the frame rate (control shown in FIGS. 6A and 6B), the exposure time becomes shorter and thus the obtained image becomes darker and darker. A change in the exposure can be suppressed by performing the imaging with the exposure at 1/480 sec set in advance, but this will cause the "sense of ruffling" at 60 fps. In addition, the sensitivity may be changed in accordance with the change in the exposure time. However, an S/N changes as the sensitivity changes, and thus the "sense of granularity" (presence or absence, degree, pattern, and the like of granular noise in image) changes. Thus, as shown in FIG. 6C, the dimming control processing unit 352 (processor) and the lens drive control unit 360 (processor) can continuously change a density (dimming degree) of the dimming element 210 in accordance with the change in the exposure time (step S190: dimming degree control processing, dimming degree control step). For example, an ND value (degree of dimming) that is 16 at the time point T1 is lowered to 4 at the time point T2. With such control of the dimming degree, it is possible to capture the moving image that gradually slows down while maintaining a brightness and the sense of granularity constant. The frame rate, exposure time, and degree of dimming may be changed stepwise rather than continuously.

<Recording and Displaying of First Moving Image>

The imaging unit 350 (processor) captures the moving image (first moving image, slow moving image) under the frame rate, exposure time, and dimming degree subjected to the above control and records the image on the recording device 380. The "first moving image" is a moving image captured by increasing the frame rate after the first timing, shortening the exposure time, and changing the degree of dimming. In this case, the imaging unit 350 records in the header or the like of the moving image file that "moving image having a frame rate of 60 fps". The display control unit 356 can reproduce and display the captured moving image on the monitor 390 at the recorded frame rate (step S200: first imaging, first display, first imaging step, first display step). Thus, an effect of the slow moving image can be obtained. The first moving image, the second moving image (described below), and the normal moving image can be recorded in the same moving image file.

The imaging unit 350 and the display control unit 356 may display the moving image acquired in this manner on the monitor 390 in real time (step S200: first imaging, first display, first imaging step, first display step). In a case where the moving image is displayed in real time, the imaging unit 350 and the display control unit 356 display the normal moving image on the monitor 390 during a period in which the normal moving image is acquired (period in which the frame rate or the like is not controlled). Further, during a period in which the first moving image is acquired (period in which the frame rate and the like are controlled), the imaging unit 350 and the display control unit 356 may thin out frames of the first moving image to generate the second moving image having an initial frame rate (the same frame rate and the like as the normal moving image) and display the second moving image on the monitor 390 in real time (second imaging, second display, second imaging step, second display step). With such a display in real time, the user can capture the subject on the monitor 390. An aspect in which the first moving image and the second moving image are displayed at the same time will be described in Modification Example 6 described below.

The image processing device 340 (processor; imaging unit 350 and the like) continues to capture and record the first moving image until a control end timing (step S210; time point T2 which is the second timing in the examples of FIGS. 6A to 6C.

<Return to Initial Frame Rate, and Like>

After the control end timing (second timing) has elapsed (YES in step S210), the frame rate control unit 346 and the exposure control processing unit 348 return the frame rate and the exposure time to values before the frame rate control and the exposure control processing are started (step S220: frame rate control, frame rate control step, exposure control processing, exposure control step). Further, the dimming control processing unit 352 also returns the dimming degree to an original value. The original value may be returned immediately after the time point T2 has elapsed, or may be returned after a set time from the time point T2 has elapsed. The returning timing to the original value may be set in step S100 based on the user's operation or the like. Further, in a case where there is another imaging condition to be controlled, the image processing device 340 (processor) returns the condition to an original value. Accordingly, the moving image to be captured becomes the normal moving image.

The image processing device 340 (processor) repeats the above processing until there is an instruction to end the imaging (for example, pressing down release button (not shown) or the like) (until YES is obtained in step S230).

<Display of Slow Moving Image>

The display control unit 356 (processor) can display the captured moving image (normal moving image and first moving image which is slow moving image) on the monitor 390 and/or an external display device at the initial frame rate (the same frame rate as before starting the frame rate control). Accordingly, the user can watch the slow moving image with good image quality (moving image that gradually slows down toward event occurrence) for the moving subject.

As described above, in the camera 100 according to the first embodiment, the frame rate is gradually and slowly changed toward the event such as the collision according to the movement of the subject, the exposure time is changed accordingly, and thus the event can be effectively performed. In addition, with the change of the degree of dimming of the dimming element (density of variable ND filter or the like) in accordance with the change in the exposure time, it is possible to change the frame rate and the exposure time without sacrificing the change in the sense of ruffling before the frame rate changing or the sense of granularity due to the frame rate changing. As described above, with the camera 100 according to the first embodiment, it is possible to easily acquire the slow moving image with good image quality for the moving subject.

Modification Example 1: Aspect of Controlling Stop

Figure 7:
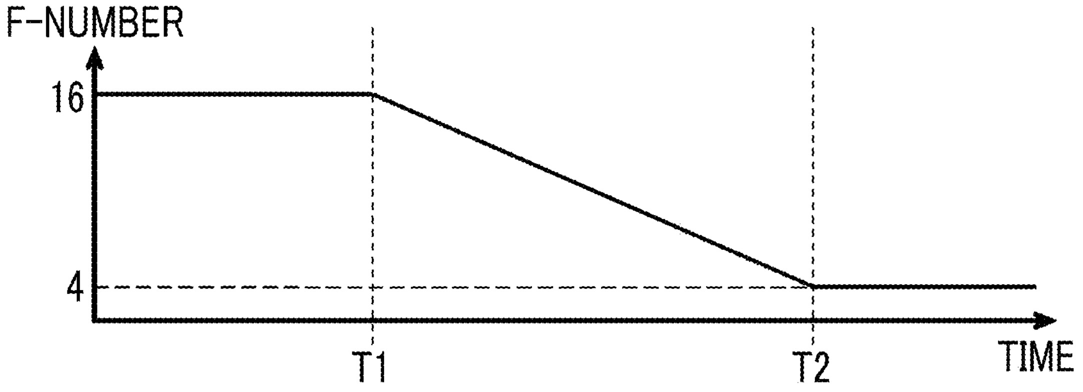
FIG. 7 is a graph showing a state of controlling stop.

In the first embodiment described above, the dimming degree (variable ND filter density) of the dimming element 210 is controlled in addition to the control of the frame rate and the exposure time. However, instead of or in addition to the dimming degree, the stop may be controlled. For example, in a case where the exposure time is controlled as shown in FIG. 6B, the stop control unit 354 (processor) can change a degree of stop of the stop 230 (stop mechanism) as shown in FIG. 7 (graph showing state of controlling stop) to a release side (F-number is changed from 16 to 4 in the example of FIG. 7), in accordance with the shortening of the exposure time, from the time point T1 (first timing) to the time point T2 (second timing) (stop control processing, stop control step). In a case where the stop is controlled, the depth of field gradually becomes shallower as the moving image slows down (frame rate increases). Thus, it is possible to further enhance the performance of the event. Whether to control the dimming degree or the stop can be decided according to the user's operation (for example, set in step S100).

Figure 8A:
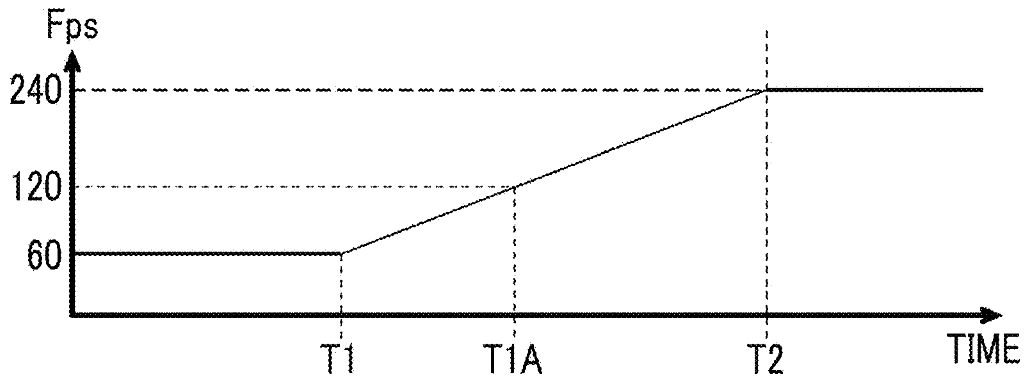
Figure 8B:
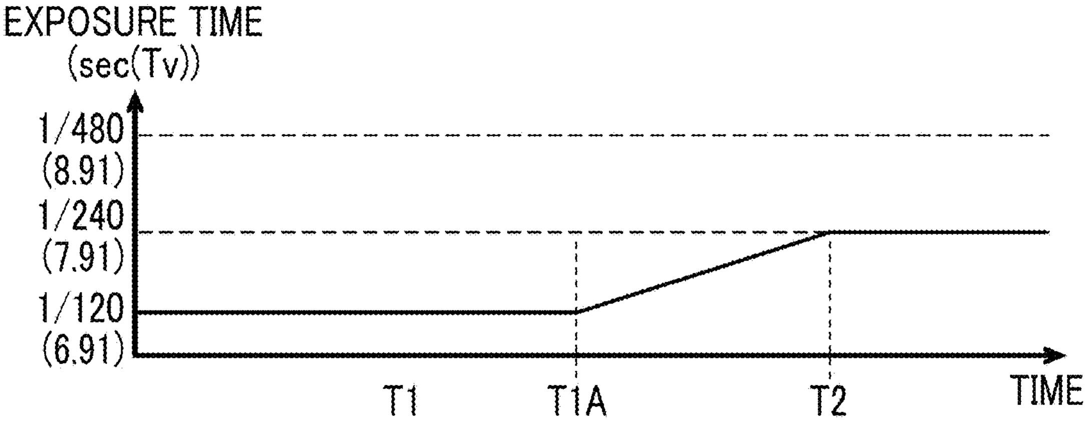
Figure 8C:
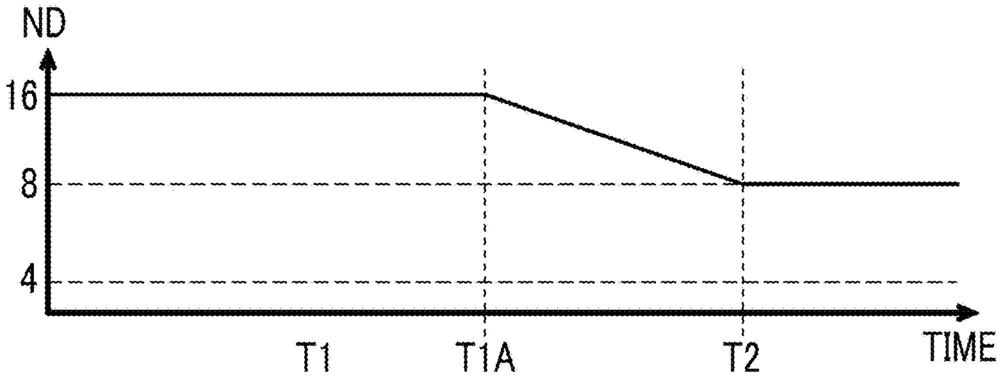

Modification Example 2: Aspect of Fixing Exposure Time and Dimming Degree for Fixed Period FIGS. 8A to 8C are other graphs showing a state of controlling the frame rate and the like. As described above, the exposure time is generally set to half of "1/frame rate" (frame interval) or half or more thereof in a normal moving image. However, in Modification Example 2, in a case where the frame rate is changed, the value of the frame rate is fixed until the exposure time becomes "1/frame rate at which the exposure time cannot be secured any more", and then the exposure time of "1/frame rate" in accordance with the frame rate is set. Accompanied by the above setting, a density change timing and an amount of change of the dimming element are also changed in accordance with the change in the exposure time.

Specifically, in a case where the frame rate is controlled as shown in FIG. 8A, the exposure time of "1/frame rate" cannot be secured after a time point T1A in a case where the exposure time remains the initial exposure time (1/120 sec). Thus, as shown in FIG. 8B, the exposure control processing unit 348 performs the control such that the exposure time point becomes "1/frame rate" after the time point T1A (first timing) (exposure time is shortened; exposure control processing, exposure control step).

Further, as shown in FIGS. 8C, the dimming control processing unit 352 reduces the degree of dimming of the dimming element 210 from the time point T1A to the time point T2 in accordance with the control of the exposure time (dimming control processing, dimming control step). In the example shown in the figures, the degree of dimming is reduced from 16 to 8 in the ND value, and the decrease in the ND value is suppressed as compared with the control aspect shown in FIGS. 6A to 6C. Accordingly, it is possible to suppress the influence of a variation in the dimming element 210 (variable ND filter).

Modification Example 3: Aspect of Setting Change Rate According to Relative Speed of Subject In a case of imaging of a scene where a speed of the subject is known, the imaging person may perform the setting in advance. However, in a case where the speed is unknown or the speed varies, it is difficult to make a right setting. Also, the imaging is not always possible to perform again many times. Even though the amount of change in the frame rate is set in advance, in a case where the speed of the subject is too fast, a timing of changing the frame rate may have already passed when the subject enters the angle of view.

Thus, in Modification Example 3, with adjustment of the amount of change in the frame rate per time in accordance with the speed of the subject, it is possible to apply the effect of slowing down in accordance with a timing at which the subject just collides (or distance becomes threshold value or less).

Figure 9:
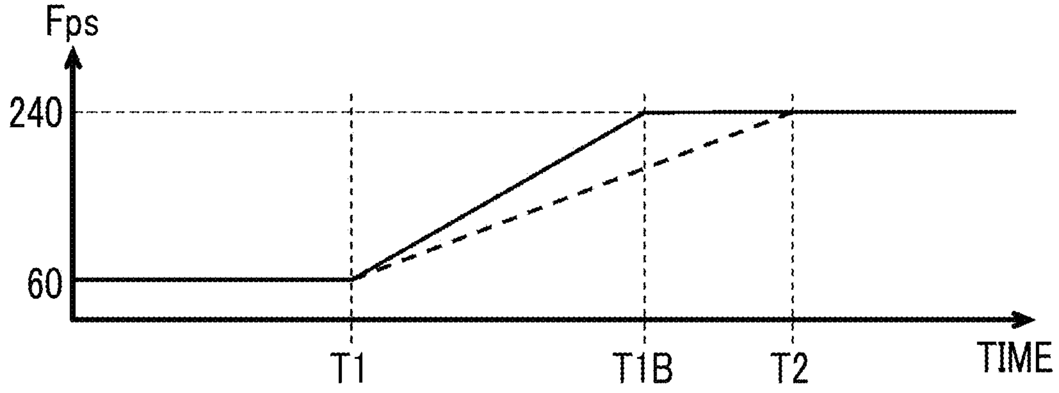
FIG. 9 is a graph showing a state of controlling the frame rate based on a relative speed of the subject.

FIG. 9 is a diagram showing a state of controlling the frame rate based on a relative speed of the subject. In the aspect shown in the figure, the frame rate control unit 346 decides the amount of change in the frame rate per time from the relative speed of the subject detected by the detection processing unit 344. Specifically, the faster the relative speed of the subject, the larger a rate of change in the frame rate (amount of change per time). For example, in a case where the relative speed of the subject is larger than the control aspect shown in FIGS. 6A to 6C (change from 60 fps to 240 fps from time point T1 to time point T2; indicated by dotted line in FIG. 9), the frame rate control unit 346 changes the frame rate along the solid line in FIG. 9 from the time point T1 to a time point T1B (before time point T2). In this case, the rate of change in the frame rate is larger than the aspect in FIGS. 6A to 6C. Depending on the relative speed of the subject, the rate of change in the frame rate may be smaller than the aspect in FIGS. 6A to 6C. In this manner, in a case where the frame rate is controlled based on the relative speed of the subject, it is preferable to control the exposure time, the dimming degree, the stop, and the like in accordance with the frame rate.

Modification Example 4: Aspect of Setting Bit Rate According to Frame Rate

As the frame rate increases due to the imaging of the slow moving image described above, the number of frames per second increases. In a case where a bit rate setting (Mbps) is left as it is in this situation, an amount of data that can be used for one frame decreases, and thus the image quality deteriorates even though the scene is reproduced in a slowed manner. Thus, in Modification Example 4, a compression rate is changed according to the frame rate. Specifically, the imaging unit 350 captures the moving image (first moving image) by setting the bit rate higher (lower as compression rate) as the frame rate is higher such that the bit rate during reproduction becomes constant. Accordingly, the problem of image quality deterioration can be solved, and it is possible to maintain the image quality of the slow scene and acquire the slow moving image with good image quality.

Modification Example 5: Control in Case Where Part of Subject is Stationary

Figure 10A:
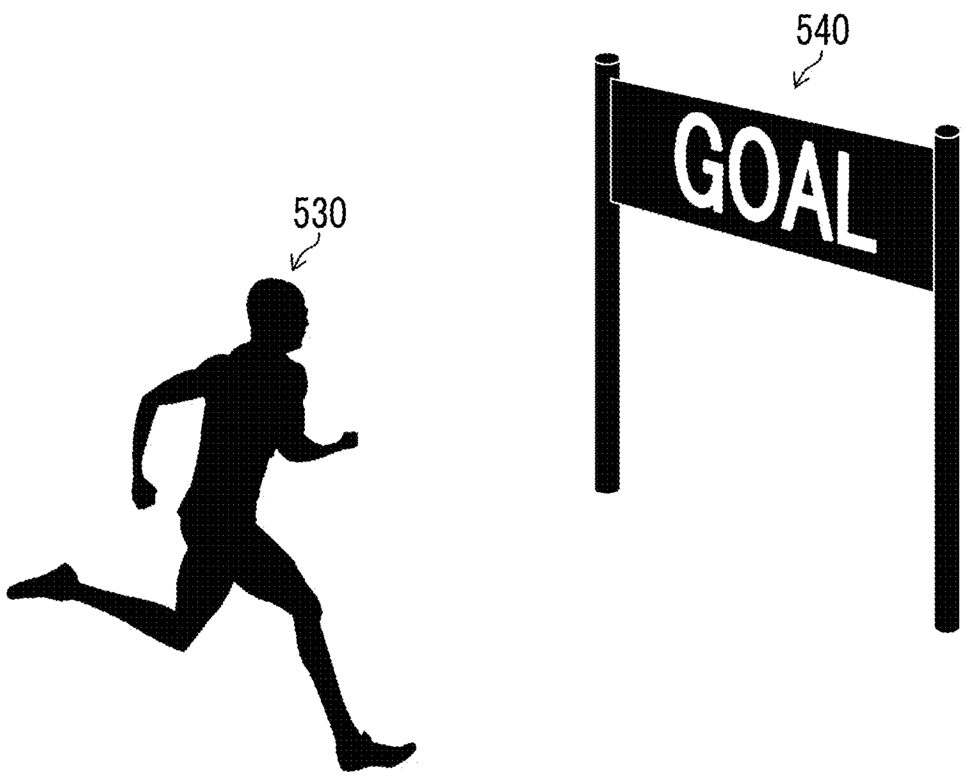
FIGS. 10A and 10B are diagrams showing event occurrence by a moving subject and a stationary subject.
Figure 10B:

Although the case where the plurality of subjects are moving is described in FIGS. 5A to 6C, according to the present invention, it is possible to capture the slow moving image even in a case where some of the subjects are stationary. FIGS. 10A and 10B are diagrams showing the event occurrence by a moving subject and a stationary subject. In the examples shown in FIGS. 10A and 10B, an athlete 530 is running toward a stationary goal 540, as shown in FIG. 10A. As shown in FIG. 10B, the athlete 530 approaches or passes the goal 540 as time passes (distance between plurality of subjects becomes equal to or less than threshold value). By controlling the frame rate and the like with a timing of passing the goal as the “event”, the user can easily acquire the slow moving image with good image quality for the moving subject (athlete 530) in the same manner as the aspect described above. In a case where the slow moving image is captured by including the stationary subject (goal 540) as in the examples of FIGS. 10A and 10B, it is preferable to designate the stationary subject in advance in response to the user’s operation via the operation unit 370, the monitor 390, or the like.

Modification Example 6: Aspect of Displaying First Moving Image and Second Moving Image at Same Time In a case where the slow moving image is captured, the user can capture the subject by displaying the moving image on the monitor 390 (display device) in real time as described above. However, even though the moving image (first moving image) that changes slowly by changing the frame rate or the like as described above is captured, the effect cannot be verified unless the image is reproduced after the imaging is completed. Thus, in Modification Example 6, in addition to the display of the normal moving image and the second moving image in real time, the first moving image (moving image captured by reflecting slow effect) is displayed at the same time.

Figure 11:
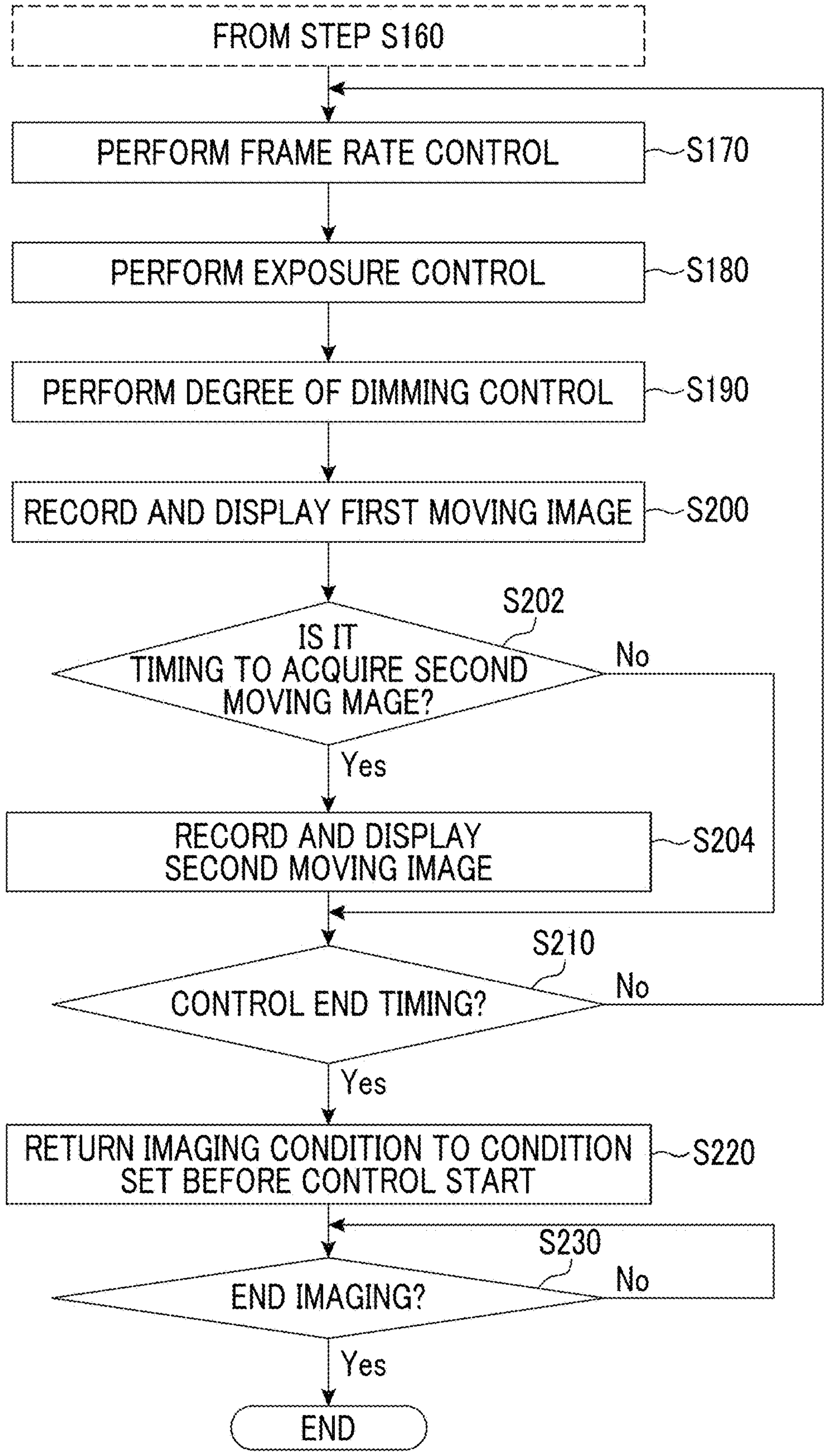
FIG. 11 is a flowchart showing processing of Modification Example 6.

FIG. 11 is a flowchart showing processing of Modification Example 6. In the flowchart of the figure, the same step number is assigned to the same processing of the flowcharts of FIGS. 3 and 4, and detailed description thereof will be omitted.

The imaging unit 350 (processor) determines whether or not it is a timing to acquire the second moving image (step S202: second imaging, second imaging step). For example, in a case where the frame rate of the first moving image is twice the initial frame rate, one of two frames is thinned out to make the remaining frame the second moving image. In a case where the frame rate of the first moving image is three times the initial frame rate, two of three frames are thinned out to make the remaining frame the second moving image. As the frame rate of the first moving image increases, the thinning rate also increases. The imaging unit 350 records the second moving image on the recording device 380, and the display control unit 356 causes the monitor 390 to display the second moving image (step S204: second imaging, second imaging step).

Figure 12A:
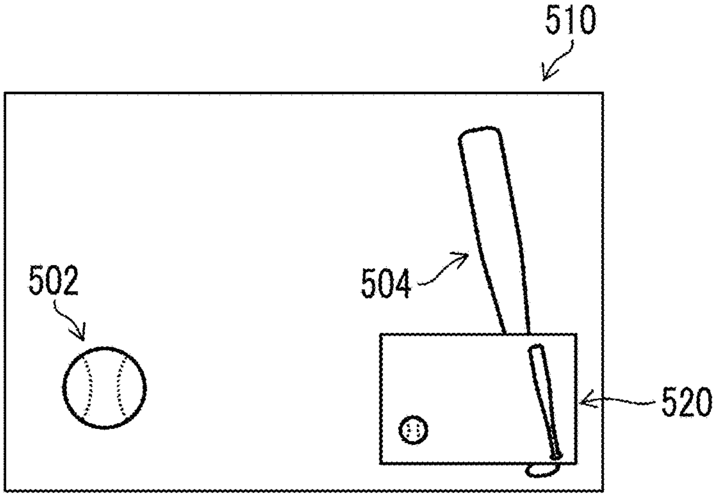
FIGS. 12A to 12C are diagrams showing a state in which a first moving image and a second moving image are displayed at the same time.
Figure 12B:
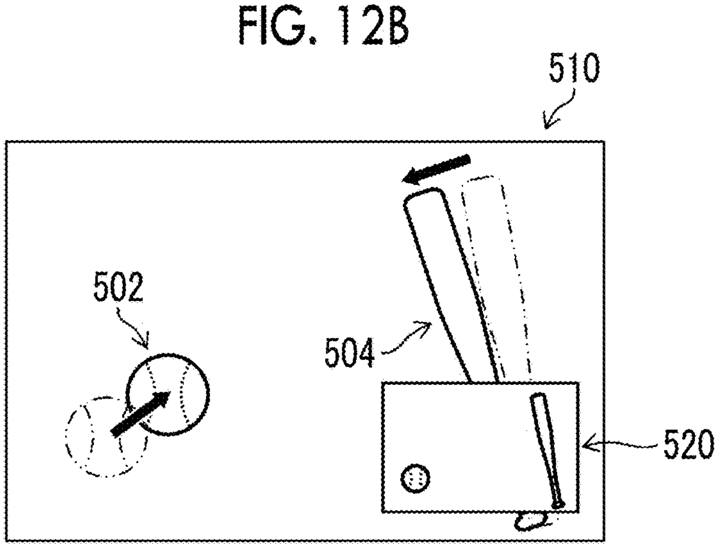
Figure 12C:
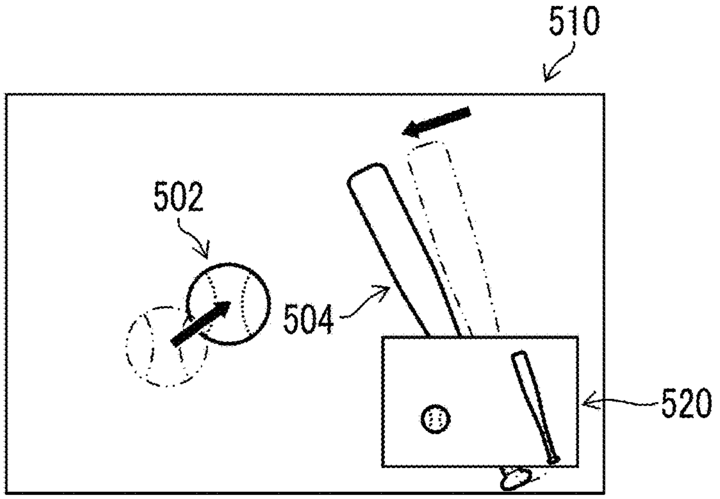

FIGS. 12A to 12C are diagrams showing a state in which the first moving image and the second moving image are displayed at the same time. In FIG. 12A, in a display area of the monitor 390, a first moving image display area 520 is provided in a second moving image display area 510. FIG. 12A shows a state in which the control of the frame rate is started (state of first timing), and there is no difference between the first moving image and the second moving image. On the contrary, FIGS. 12A to 12C show a state in which the frame rate is increased and the difference between the first moving image and the second moving image is widened. With such a display, the user can check the state of the first moving image (slow moving image) while capturing the subject in the second moving image.

In the examples of FIGS. 12A to 12C, the first moving image display area 520 is provided in the second moving image display area 510, but conversely, the second moving image display area 510 may be provided in the first moving image display area 520. Further, the display control unit 356 may display the first moving image and the second moving image on different display areas or different display devices.

Modification Example 7: Recommendation for User

The information output unit 358 (processor) may output the information prompting the user to set at least one of the frame rate, the exposure time, the degree of dimming of the dimming element, the stop, the sensitivity, or the bit rate to the monitor 390, the speaker 395, or the like, according to the set imaging condition and the situation of a scene to be captured (brightness, movement of the subject, or the like).

For example, in a situation where the imaging scene is bright and the dimming element 210 (variable ND filter) cannot be further darkened with the exposure set by the user before the switching of the frame rate and is overexposed, the information output unit 358 can output information prompting external attachment of the ND filter. Further, in the same situation, the information output unit 358 can output information prompting the stop 230 to be narrowed down or information prompting the exposure time to be shortened. With the setting of the stop and the exposure time according to such information, the user can perform the imaging with an appropriate exposure even for a bright scene.

On the contrary, in a case where the imaging scene is dark, the information output unit 358 can output information prompting the sensitivity to be increased, information prompting the stop to be widened, or information prompting a fastest value (target value) of the controlled frame rate to be decreased (that is, degree of slowness at time of reproduction to be weakened). With the setting according to such information, the user can perform the imaging with an appropriate exposure even for a dark scene.

The information output unit 358 can output such information at a timing such as in a case where the imaging condition is set (step S100) or in a case where the imaging instruction is issued (YES in step S110).

In a case where such information is output, the information output unit 358 may also output a warning indicating "with operation or setting according to information, moving image different from imaging intention may be captured" to the monitor 390, the speaker 395, or the like. For example, it is possible to output the information indicating that the depth of field changes by the change in the stop, the "sense of ruffling" changes by the change in the exposure time, or the "sense of granularity" changes by the change in the sensitivity. With such an output, it is possible to broaden a range of choices of the user, such as "priority is given to imaging with appropriate exposure" and "priority is given to making the depth of field or the like as intended".

Second Embodiment

Although the camera 100 which is a digital camera is described in the first embodiment, the configuration of the imaging device is not limited thereto. Another imaging device of the present invention may be, for example, a built-in type or external type camera for personal computer (PC) or a mobile terminal device having an imaging function as described below.

Examples of the mobile terminal device according to the embodiment of the imaging device of the present invention include a mobile phone or smartphone, a personal digital assistant (PDA), a portable game machine, and a smartwatch. Hereinafter, a smartphone will be described as an example in detail with reference to drawings.

Figure 13A:
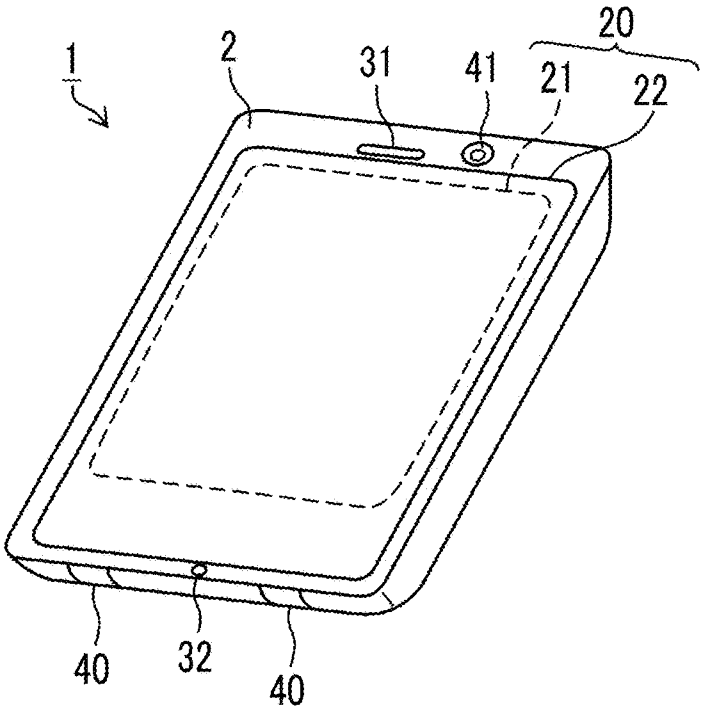
FIGS. 13A and 13B are external views of a smartphone according to a second embodiment.
Figure 13B:
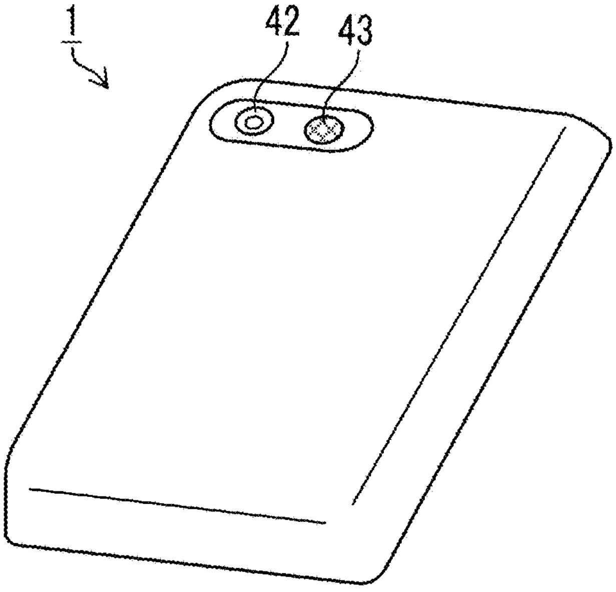

FIGS. 13A and 13B are external views of a smartphone 1 (imaging device, imaging device body) according to a second embodiment. FIG. 13A is a front view, and FIG. 13B is a rear view. The smartphone 1 shown in FIGS. 13A and 13B has a flat housing 2 and comprises a display input unit 20 in which a display panel 21 (display device) as a display unit and an operation panel 22 (operation unit) as an input unit are integrated on one surface of the housing 2. Further, the housing 2 includes a speaker 31 (speaker), a microphone 32, an operation unit 40 (operation unit), camera units 41 and 42 (imaging device), and a strobe 43. A configuration of the housing 2 is not limited thereto. For example, a configuration in which the display unit and the input unit are independent may be employed, or a configuration having a folding structure or a slide mechanism may be employed.

Figure 14:
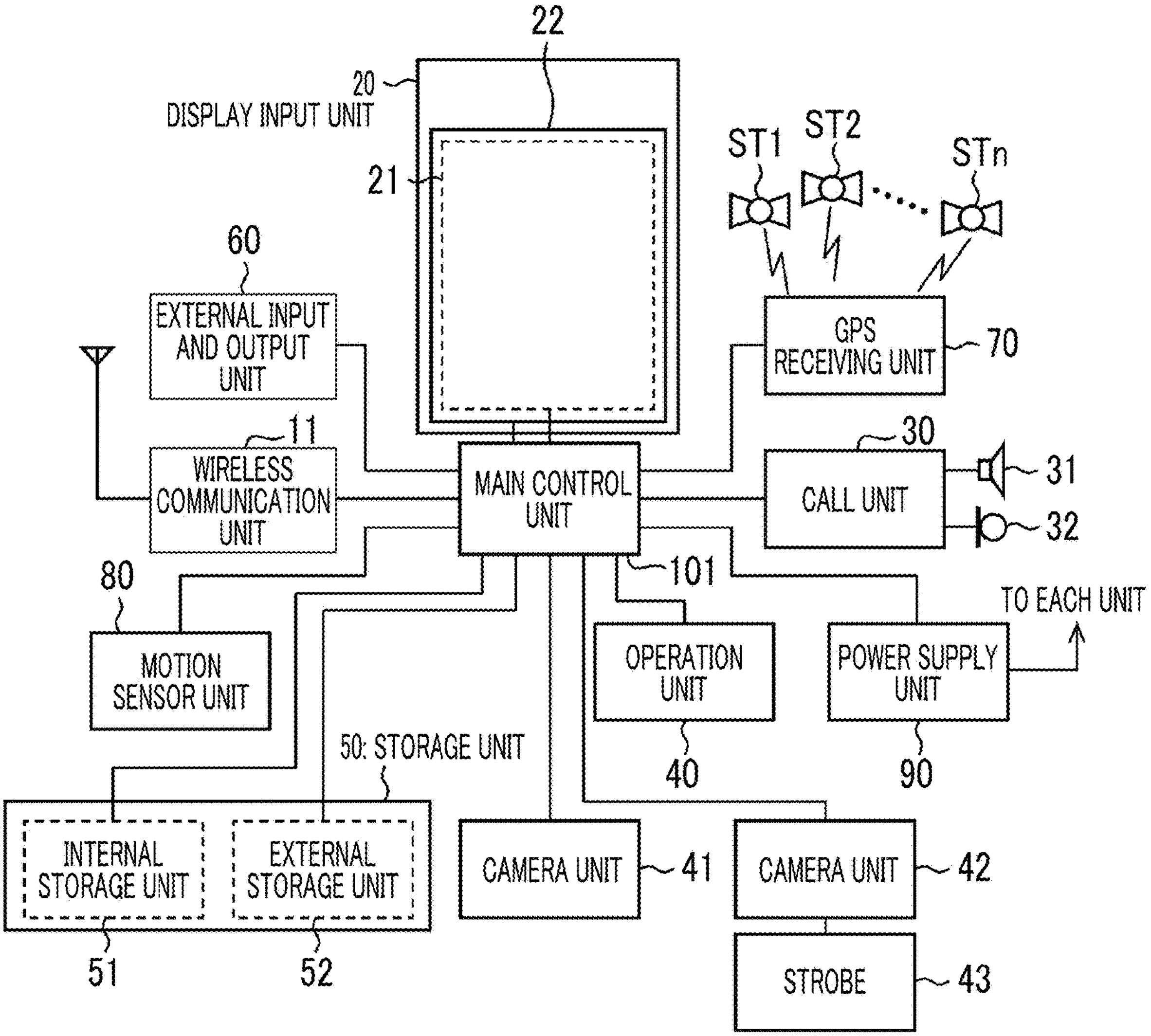
FIG. 14 is a block diagram showing a schematic configuration of the smartphone.

FIG. 14 is a diagram showing a schematic configuration of the smartphone 1. As shown in FIG. 14, the smartphone 1 comprises a wireless communication unit 11, the display input unit 20, a call unit 30, the operation unit 40, the camera units 41 and 42, the strobe 43, a storage unit 50, an external input and output unit 60, a global positioning system (GPS) receiving unit 70, a motion sensor unit 80, and a power supply unit 90. Further, the smartphone 1 comprises a main control unit 101 (processor). A wireless communication function for performing mobile wireless communication via a base station device and a mobile communication network is provided as a main function of the smartphone 1.

The wireless communication unit 11 performs wireless communication with the base station device accommodated in the mobile communication network in response to an instruction from the main control unit 101. Using such wireless communication, various pieces of file data such as voice data and image data, e-mail data, and the like are transmitted and received, and Web data, streaming data, and the like are received.

The display input unit 20 is a so-called touch panel in which an image (still image and/or moving image), character information, or the like is displayed to visually transmit information to the user and a user operation on the displayed information is detected under control of the main control unit 101, and comprises the display panel 21 and the operation panel 22.

In the display panel 21, a liquid crystal display (LCD), an organic light-emitting diode (OLED), or the like is used as a display device. The operation panel 22 is a device that is placed such that an image displayed on a display surface of the display panel 21 is visually recognizable and detects one or a plurality of coordinates operated by a finger of the user or a conductor such as a pen. In a case where such a device is operated by the finger of the user or the conductor such as the pen, the operation panel 22 outputs, to the main control unit 101, a detection signal generated due to the operation. Next, the main control unit 101 detects an operation position (coordinates) on the display panel 21 based on the received detection signal.

As shown in FIGS. 13A and 13B, although the display panel 21 and the operation panel 22 of the smartphone 1 exemplified as an embodiment of the imaging device of the present invention integrally constitute the display input unit 20, the operation panel 22 is disposed so as to completely cover the display panel 21. In a case where such a disposition is employed, the operation panel 22 may comprise a function of detecting the user operation even in an area outside the display panel 21. In other words, the operation panel 22 may comprise a detection area (hereinafter referred to as display area) for an overlapping portion that overlaps the display panel 21 and a detection area (hereinafter referred to as non-display area) for the other outer edge portion that does not overlap the display panel 21.

The call unit 30 comprises the speaker 31 and the microphone 32. The call unit 30 can convert a voice of the user input through the microphone 32 into voice data that can be processed by the main control unit 101 and output the converted voice data to the main control unit 101, and can decode the voice data received by the wireless communication unit 11 or the external input and output unit 60 and output the decoded voice data from the speaker 31. Further, as shown in FIGS. 13A and 13B, it is possible to mount the speaker 31 on the same surface as a surface on which the display input unit 20 is provided, and to mount the microphone 32 on a side surface of the housing 2, for example.

The operation unit 40 is a hardware key using a key switch or the like and receives the instruction from the user. For example, as shown in FIGS. 13A and 13B, the operation unit 40 is a push-button type switch that is mounted on the side surface of the housing 2 of the smartphone 1, is turned on in a case of being pressed with a finger or the like, and is turned off by restoring force of a spring or the like in a case where the finger is released.

The storage unit 50 (recording device) stores a control program or control data of the main control unit 101, application software, address data in which a name, a telephone number, and the like of a communication partner are associated, data of transmitted and received e-mails, Web data downloaded by Web browsing, or downloaded content data, and temporarily stores streaming data or the like. The storage unit 50 is configured of an internal storage unit 51 built into the smartphone and an external storage unit 52 having an attachable and detachable slot for external memory. Each of the internal storage unit 51 and the external storage unit 52 constituting the storage unit 50 is formed by using a known storage medium.

The external input and output unit 60 serves as an interface with all external devices connected to the smartphone 1. The smartphone 1 is directly or indirectly connected to another external device via the external input and output unit 60 by communication or the like. Examples of a unit for communication or the like include a universal serial bus (USB), IEEE1394, and a network (for example, the Internet and a wireless LAN). In addition, examples of the unit for communication or the like include Bluetooth (registered trademark), radio frequency identification (RFID), and infrared communication (infrared data association: IrDA) (registered trademark). Further, examples of the unit for communication or the like include ultra wideband (UWB) (registered trademark) and ZigBee (registered trademark).

Examples of the external device connected to the smartphone 1 include a wired/wireless headset, a wired/wireless external charger, and a wired/wireless data port. Further, examples of the external device include a memory card and a subscriber identity module (SIM) card/user identity module (UIM) card connected via a card socket. Further, the external device connected thereto includes external audio and video devices connected via audio and video input/output (I/O) terminals, external audio and video devices wirelessly connected, smartphones wired/wirelessly connected, PDAs wired/wirelessly connected, personal computers wired/wirelessly connected, and earphones. The external input and output unit 60 can transmit the data transmitted from such an external device to each component inside the smartphone 1 or can transmit the data inside the smartphone 1 to the external device.

The motion sensor unit 80 comprises, for example, a triaxial acceleration sensor or an inclination sensor and detects a physical movement of the smartphone 1 in response to the instruction from the main control unit 101. With the detection of the physical movement of the smartphone 1, a moving direction, acceleration, or posture of the smartphone 1 is detected. Such a detection result is output to the main control unit 101. The power supply unit 90 supplies electric power accumulated in a battery (not shown) to each unit of the smartphone 1 in response to the instruction from the main control unit 101.

The main control unit 101 comprises a microprocessor and operates according to the control program or the control data stored in the storage unit 50 to integrally control each unit of the smartphone 1 including the camera unit 41. The main control unit 101 has a mobile communication control function for controlling each unit of a communication system and an application processing function for performing voice communication or data communication through the wireless communication unit 11.

The main control unit 101 also has an image processing function such as displaying a moving image on the display input unit 20 based on the image data (data of still image or moving image) such as received data or downloaded streaming data. The image processing function means a function of the main control unit 101 decoding the image data, performing the image processing on such a decoding result, and displaying an image on the display input unit 20.

The camera units 41 and 42 are digital cameras (imaging devices) that perform electronic imaging using the imaging element such as CMOS or CCD. Further, the camera units 41 and 42 can convert the image data (moving image, still image) obtained by imaging into compressed image data such as MPEG or JPEG, and record the compressed image data in the storage unit 50 or output the compressed image data through the external input and output unit 60 and the wireless communication unit 11, under the control of the main control unit 101. Further, the camera units 41 and 42 can also capture the slow moving images (first moving image, second moving image) under the control of the main control unit 101. In the smartphone 1 shown in FIGS. 13A, 13B, and 14, one of the camera units 41 and 42 can be used for imaging, or the camera units 41 and 42 can be used at the same time for imaging. In a case where the camera unit 42 is used, the strobe 43 can be used. The camera units 41 and 42 are provided with a dimming element in which the dimming degree is variable, as in the camera 100 according to the first embodiment (not shown in FIGS. 13A, 13B, and 14). The dimming element (ND filter or the like) may be an external type. A stop mechanism in which the degree of stop is variable may be further provided.

The camera units 41 and 42 can be used for various functions of the smartphone 1. For example, the smartphone 1 can display images acquired by the camera units 41 and 42 on the display panel 21. Further, the smartphone 1 can use the images of the camera units 41 and 42 as one of the operation inputs of the operation panel 22. Further, in a case where the GPS receiving unit 70 detects a position based on positioning information from GPS satellites ST1, ST2, . . . , and STn, the smartphone 1 detects the position by referring to the images from the camera units 41 and 42. Furthermore, the smartphone 1 can determine an optical axis direction of the camera unit 41 of the smartphone 1 or a current use environment without using the triaxial acceleration sensor or in combination with the triaxial acceleration sensor with reference to the images from the camera units 41 and 42. Of course, the smartphone 1 can use the images from the camera units 41 and 42 in the application software. In addition, the smartphone 1 can add the position information acquired by the GPS receiving unit 70, voice information acquired by the microphone 32 (may be text information subjected to voice-text conversion by the main control unit or the like), posture information acquired by the motion sensor unit 80, and the like to the image data of the still image or the moving image and record the image data thereof with the added information in the storage unit 50. Further, the smartphone 1 can also output the image data of the still image or the moving image through the external input and output unit 60 and the wireless communication unit 11.

As in the camera 100 according to the first embodiment, the smartphone 1 having the above configuration also can execute the processing (detection of subject movement, imaging of first and second moving images, control of frame rate and exposure time, control of dimming degree and degree of stop, and the like) of the imaging method according to the present invention. Specifically, the processing (including processing of flowcharts of FIGS. 3, 4, 11) executed by the image processing device 340 (each part shown in FIG. 2) in the first embodiment is mainly executed by the camera units 41 and 42 and the main control unit 101 in the smartphone 1. In addition, the functions of the operation unit 370, the recording device 380, the monitor 390, and the speaker 395 in the first embodiment can be respectively realized by the operation unit 40, the storage unit 50 and the operation panel 22, the display panel 21 and the operation panel 22, and the speaker 31 in the smartphone 1.

Accordingly, it is possible to easily acquire the same effect (easily acquire slow moving image with good image quality) as that of the camera 100 according to the first embodiment, also in the smartphone 1 according to the second embodiment.

Although the embodiments of the present invention have been described above, the present invention is not limited to the above-described aspects, and various modifications can be made without departing from the spirit of the present invention.

What is claimed is:

1. An imaging device comprising:
an optical system;
an imaging element;
a sensor configured to detect a physical movement of the imaging device; and
a processor configured to perform:
detection processing of detecting a movement of a subject based on the detected physical movement of the imaging device;
frame rate control of increasing a frame rate of a moving image output from the imaging element based on the detected movement of the subject;
exposure control processing of maintaining a rate of an exposure time per frame of the moving image constant according to the increase in the frame rate; and
dimming control processing of changing a degree of dimming of the optical system according to the exposure control processing,
wherein the processor is further configured to:
calculate a first timing for starting to change the frame rate and the exposure time, and a second timing for setting the frame rate and the exposure time as target values, based on the detected movement of the subject;
increase the frame rate from the first timing to the second timing; and
shorten the exposure time from the first timing to the second timing.

2. The imaging device according to claim 1,
wherein the processor calculates a timing at which a distance between a plurality of subjects is equal to or less than a threshold value as the second timing based on the detected movement of the subjects in the frame rate control.

3. The imaging device according to claim 2,
wherein the processor sets a rate of change in the frame rate and the exposure time according to a relative speed between the plurality of subjects.

4. The imaging device according to claim 1,
wherein the processor sets the target values for the frame rate and the exposure time.

5. The imaging device according to claim 1,
wherein the processor returns values of the frame rate, the exposure time, and the degree of dimming to values set before starting the frame rate control, the exposure control processing, and the dimming control processing after the second timing has elapsed.

6. The imaging device according to claim 1,
wherein the processor captures a first moving image, which is a moving image of the increased frame rate after the first timing, by setting a bit rate higher as the frame rate is higher.

7. The imaging device according to claim 6,
wherein the processor sets an exposure time per frame to half or more of a frame interval for the first moving image.

8. The imaging device according to claim 6,
wherein the processor displays the first moving image on a display device at the same initial frame rate as before starting the frame rate control.

9. The imaging device according to claim 8,
wherein the processor thins out a frame of the first moving image to generate a second moving image having the initial frame rate and displays the first moving image and the second moving image on the display device at the initial frame rate.

10. The imaging device according to claim 1,
wherein the processor outputs information prompting a user to set at least one of a frame rate, an exposure time, a degree of dimming of a dimming element, a stop, a sensitivity, or a bit rate.

11. The imaging device according to claim 1,
wherein the optical system has a stop mechanism in which a degree of stop is variable, and
the processor changes the degree of stop of the stop mechanism to a release side in accordance with shortening of the exposure time.

12. An imaging method by an imaging device including an optical system, an imaging element, a sensor and a processor, the method comprising:
detecting, by the sensor, a physical movement of the imaging device;
detecting, by the processor, a movement of a subject based on the detected physical movement of the imaging device;
continuously increasing, by the processor, a frame rate of a moving image output from the imaging element based on the detected movement of the subject;
maintaining, by the processor, a rate of an exposure time per frame of the moving image constant according to the increase in the frame rate; and
changing, by the processor, a degree of dimming of the optical system according to the control of the exposure time,
wherein:
a first timing for starting to change the frame rate and the exposure time, and a second timing for setting the frame rate and the exposure time as target values, are calculated based on the detected movement of the subject;
the frame rate is increased from the first timing to the second timing; and
the exposure time is shortened from the first timing to the second timing.

13. A non-transitory, computer-readable tangible recording medium which records thereon, a program for causing, when read by a computer, the computer to perform the imaging method according to claim 12.

* * * * *